United States Patent
Nagaraja et al.

(10) Patent No.: US 10,517,002 B2
(45) Date of Patent: Dec. 24, 2019

(54) USER EQUIPMENT (UE) INDICATION OF COVERAGE MISMATCH BETWEEN COMMON SEARCH SPACE (CSS) AND USER-SPECIFIC SEARCH SPACE (USS) FOR REMAINING MINIMUM SYSTEM INFORMATION (RMSI) DELIVERY

(71) Applicant: QUALCOMM Incorporated, San Diego, CA (US)

(72) Inventors: Sumeeth Nagaraja, San Diego, CA (US); Tao Luo, San Diego, CA (US); Makesh Pravin John Wilson, San Diego, CA (US); Sony Akkarakaran, Poway, CA (US); Juan Montojo, San Diego, CA (US); Shengbo Chen, San Diego, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/037,881

(22) Filed: Jul. 17, 2018

(65) Prior Publication Data
US 2019/0028907 A1    Jan. 24, 2019

Related U.S. Application Data

(60) Provisional application No. 62/535,175, filed on Jul. 20, 2017.

(51) Int. Cl.
*H04W 24/02* (2009.01)
*H04W 36/16* (2009.01)

(52) U.S. Cl.
CPC ......... *H04W 24/02* (2013.01); *H04W 36/165* (2013.01)

(58) Field of Classification Search
None
See application file for complete search history.

(56) References Cited

U.S. PATENT DOCUMENTS 10,390,339 B2 *  8/2019  Yasukawa ............. H04L 5/0053
2011/0070845 A1   3/2011  Chen et al.
(Continued)

OTHER PUBLICATIONS

International Search Report and Written Opinion—PCT/US2018/042664—ISA/EPO—dated Oct. 22, 2018.
(Continued)

*Primary Examiner* — Otis L Thompson, Jr.
(74) *Attorney, Agent, or Firm* — Patterson & Sheridan, LLP

(57) ABSTRACT

Certain aspects of the present disclosure provide techniques for identifying a mismatch between a user's common search space (CSS) and user-specific search space (USS). A base station (BS) may receive an indication that a user equipment (UE) decoded at least one beamformed signal transmitted by the BS in a USS and did not decode at least one beamformed signal transmitted by the BS in a CSS. The BS may take one or more actions based, at least in part, on the indication. Similarly, a UE may decode at least one beamformed signal transmitted by a BS in a USS, transmit to the BS an indication that the UE decoded the at least one beamformed signal transmitted in the USS and did not decode at least one beamformed signal transmitted by the BS in a CSS, and take one or more actions based, at least in part, on the indication.

30 Claims, 11 Drawing Sheets

(56) References Cited

U.S. PATENT DOCUMENTS

| | | | |
|---|---|---|---|
| 2012/0157140 A1 | 6/2012 | Kim et al. | |
| 2013/0051214 A1* | 2/2013 | Fong | H04W 24/10 370/216 |
| 2013/0070689 A1* | 3/2013 | Liu | H04W 72/0413 370/329 |
| 2013/0250782 A1 | 9/2013 | Nimbalker et al. | |
| 2013/0252606 A1* | 9/2013 | Nimbalker | H04B 17/309 455/434 |
| 2014/0177556 A1* | 6/2014 | Pan | H04L 5/0053 370/329 |
| 2014/0192740 A1* | 7/2014 | Ekpenyong | H04L 5/0094 370/329 |
| 2015/0016369 A1* | 1/2015 | Park | H04B 7/024 370/329 |
| 2015/0016385 A1* | 1/2015 | Aiba | H04L 5/0053 370/329 |
| 2015/0146639 A1* | 5/2015 | Seo | H04L 5/0053 370/329 |
| 2015/0304995 A1* | 10/2015 | Yi | H04L 5/001 370/329 |
| 2015/0312920 A1* | 10/2015 | Hu | H04W 24/10 370/329 |
| 2015/0358962 A1* | 12/2015 | Lee | H04W 72/0446 370/336 |
| 2015/0373668 A1* | 12/2015 | Lee | H04W 72/042 370/329 |
| 2016/0119900 A1* | 4/2016 | You | H04W 4/70 |
| 2017/0019236 A1* | 1/2017 | Yang | H04L 5/0055 |
| 2017/0094569 A1* | 3/2017 | Urabayashi | H04W 36/00 |
| 2017/0303247 A1* | 10/2017 | Yasukawa | H04W 72/042 |
| 2018/0139023 A1* | 5/2018 | Li | H04L 5/0051 |
| 2018/0368117 A1* | 12/2018 | Ying | H04W 72/042 |
| 2018/0375628 A1* | 12/2018 | Lee | H04W 72/0406 |
| 2019/0081691 A1* | 3/2019 | Nagaraja | H04B 17/309 |

OTHER PUBLICATIONS

LG Electronics: "Discussion on Multi-Beam Operation for NR-PDCCH", 3GPP Draft; R1-1710307, 3rd Generation Partnership Project (3GPP), Mobile Competence Centre; 650, Route Des Lucioles; F-06921 Sophia Antipolis Cedex; France, vol. RAN WG1, No. Qingdao, P.R. China; Jun. 27, 2017-Jun. 30, 2017, Jun. 26, 2017 (Jun. 26, 2017), pp. 1-4, XP051299523, Retrieved from the Internet: URL: http://www.3gpp.org/ftp/Meetings_3GPP_SYNC/RAN1/Docs/ [retrieved on Jun. 26, 2017].

Qualcomm Incorporated: "Considerations of RLM/RLF in NR", 3GPP Draft; R2-1706909 RLM-RLF, 3rd Generation Partnership Project (3GPP), Mobile Competence Centre; 650, Route Des Lucioles; F-06921 Sophia Antipolis Cedex; France, vol. RAN WG2, No. Qingdao, China; Jun. 27, 2017-Jun. 29, 2017, Jun. 26, 2017 (Jun. 26, 2017), pp. 1-4, XP051301406, Retrieved from the Internet: URL: http://www.3gpp.org/ftp/Meetings_3GPP_SYNC/RAN2/Docs/ [retrieved on Jun. 26, 2017].

* cited by examiner

USER EQUIPMENT (UE) INDICATION OF COVERAGE MISMATCH BETWEEN COMMON SEARCH SPACE (CSS) AND USER-SPECIFIC SEARCH SPACE (USS) FOR REMAINING MINIMUM SYSTEM INFORMATION (RMSI) DELIVERY

CROSS-REFERENCE TO RELATED APPLICATIONS

This application claims benefit of priority to U.S. Provisional Application Ser. No. 62/535,175, filed on Jul. 20, 2017, entitled "USER EQUIPMENT (UE) INDICATION OF COVERAGE MISMATCH BETWEEN COMMON SEARCH SPACE (CSS) AND USER-SPECIFIC SEARCH SPACE (USS) FOR REMAINING MINIMUM SYSTEM INFORMATION (RMSI) DELIVERY," which is expressly incorporated by reference herein in its entirety.

INTRODUCTION

Field of the Disclosure

Aspects of the present disclosure relate to wireless communications, and more particularly, to techniques for identifying a coverage mismatch between a common search space (CSS) and a user-specific search space (USS) and taking one or more actions based, at least in part, on the identified coverage mismatch.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for determining when a UE is in area wherein a coverage mismatch exists between the UE's CSS and USS. The UE and its serving BS may take one or more actions based on determining a coverage mismatch for the UE.

Certain aspects of the present disclosure provide a method for wireless communication that may be performed, for example, by a BS. The method includes receiving an indication that a user equipment (UE) decoded at least one beamformed signal transmitted by the BS in a user-specific search space (USS) and did not decode at least one beamformed signal transmitted by the BS in a common search space (CSS) and taking one or more actions based, at least in part, on the indication.

Certain aspects of the present disclosure provide an apparatus for wireless communication that may be performed, for example, by a BS. The apparatus includes means for receiving an indication that a user equipment (UE) decoded at least one beamformed signal transmitted by the BS in a user-specific search space (USS) and did not decode at least one beamformed signal transmitted by the BS in a common search space (CSS) and means for taking one or more actions based, at least in part, on the indication.

Certain aspects of the present disclosure provide an apparatus for wireless communication that may be performed, for example, by a BS. The apparatus includes at least one processor and a memory coupled to the at least one processor. The at least one processor is configured to receive an indication that a user equipment (UE) decoded at least one beamformed signal transmitted by the BS in a user-specific search space (USS) and did not decode at least one beamformed signal transmitted by the BS in a common search space (CSS) and take one or more actions based, at least in part, on the indication.

Certain aspects of the present disclosure provide a computer-readable-medium at a BS having instructions stored thereon for receiving an indication that a user equipment (UE) decoded at least one beamformed signal transmitted by the BS in a user-specific search space (USS) and did not decode at least one beamformed signal transmitted by the BS in a common search space (CSS) and taking one or more actions based, at least in part, on the indication.

Certain aspects of the present disclosure provide a method for wireless communication that may be performed, for example, by a UE. The method includes decoding at least one beamformed signal transmitted by a base station (BS) in a user-specific search space (USS), transmitting, to the BS, an indication that the UE decoded the at least one beamformed signal transmitted in the USS and did not decode at least one beamformed signal transmitted by the BS in a common search space (CSS), and taking one or more actions based, at least in part, on the indication.

Certain aspects of the present disclosure provide an apparatus for wireless communication that may be performed, for example, by a UE. The apparatus includes means for decoding at least one beamformed signal transmitted by a base station (BS) in a user-specific search space (USS), means for transmitting, to the BS, an indication that the UE decoded the at least one beamformed signal transmitted in the USS and did not decode at least one beamformed signal transmitted by the BS in a common search space (CSS), and means for taking one or more actions based, at least in part, on the indication.

Certain aspects of the present disclosure provide an apparatus for wireless communication that may be performed, for example, by a UE. The apparatus includes at least one processor and a memory coupled to the at least one processor. The at least one processor is configured to decode at least one beamformed signal transmitted by a base station (BS) in a user-specific search space (USS), transmit, to the BS, an indication that the UE decoded the at least one beamformed signal transmitted in the USS and did not decode at least one beamformed signal transmitted by the BS in a common search space (CSS), and take one or more actions based, at least in part, on the indication.

Certain aspects of the present disclosure provide a computer-readable-medium at a UE having instructions stored thereon for decoding at least one beamformed signal transmitted by a base station (BS) in a user-specific search space (USS), transmitting, to the BS, an indication that the UE decoded the at least one beamformed signal transmitted in the USS and did not decode at least one beamformed signal transmitted by the BS in a common search space (CSS), and taking one or more actions based, at least in part, on the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
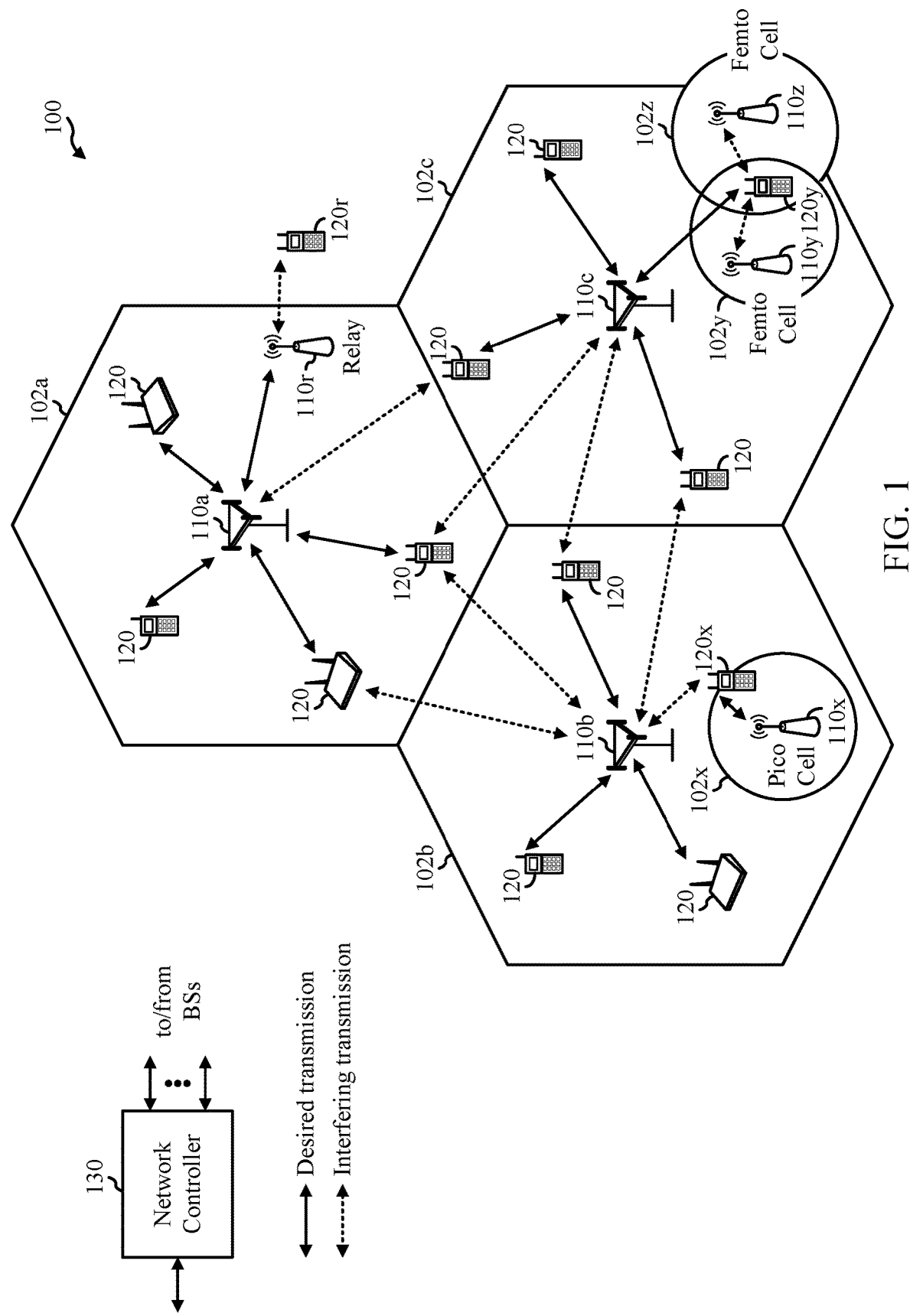
FIG. 1 is a block diagram conceptually illustrating an example telecommunications system, in accordance with certain aspects of the present disclosure.

Aspects of the present disclosure provide apparatus, methods, processing systems, and computer readable medium for identifying when a UE may be in the coverage area of a USS and not in the coverage area of the CSS.

In wireless communication systems employing beams, such as mmWave systems, high path loss may present a challenge. Accordingly, techniques including hybrid beamforming (analog and digital), which are not present in 3G and 4G systems, may be used in mmWave systems. Hybrid beamforming creates narrow beam patterns to users (e.g., UEs), which may enhance link budget/SNR.

In communication systems employing beams, a BS and UE may communicate over active beams. Active beams may be referred to as serving beams, reference beams, or quasi-colocated (quasi-colocation, QCL) beams. Stated otherwise, according to an example, active beams, serving beams, reference beams, and QCL beams may be used interchangeably. According to an example, QCL beams refer to transmissions using the same or similar beamforming as active or serving beams for which the QCL beam serves as a reference. Accordingly, QCL beams experience similar channel conditions for the active or serving beams.

Two antenna ports are said to be quasi co-located if properties of the channel over which a symbol on one antenna port is conveyed can be inferred from the channel over which a symbol on the other antenna port is conveyed. QCL supports beam management functionality including determining/estimating spatial parameters, frequency/timing offset estimation functionality including determining/ estimating Doppler/delay parameters, and radio resource management (RRM) functionality including determining/ estimating average gain. A network (e.g., BS) may indicate to a UE that the UE's data and/or control channel may be transmitted in the direction of a transmitted reference signal. The UE may measure the reference signal to determine characteristics of the data and/or control channel.

According to one example, the BS may configure a UE with four beams, each associated with a different direction and different beam identification. The BS may indicate to the UE a switch from a current active beam to one of the four configured beams. Following a beam switch command, both the UE and BS may switch to a particular beam. When a reference beam is QCL to data or control beams, the measurements the UE makes associated with a reference signal transmitted on a reference beam applies to the data or control channel, respectively. In this manner, the performance of the data or control channel may be measured using quasi-colocated reference beams.

Active beams may include BS and UE beam pairs that carry data and control channels such as PDSCH, PDCCH, PUSCH, and PUCCH. As will be described in more detail herein with respect to FIG. 7, a BS (e.g., gNB) may broadcast cell-specific broadcast signals including, for example, NR synchronization (synch) signals (NR-SS) and PDCCH-CSS using broader beams. The BS may transmit UE-specific signals including, for example, PDCCH-USS using narrower beams. The UE-specific signals may be transmitted using unicast transmissions. In general, unicast beams may have better coverage than broadcast beams due beam management and refinement procedures. Because certain information may be transmitted using the CSS, and not using the USS, a problem may arise when a UE is in the coverage area of a USS and not in the coverage area of the CSS. Aspects of the present disclosure provide methods and apparatus for identifying or determining a coverage mismatch and actions to take in response to the determined mismatch.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As will be described in more detail herein, in communication systems employing beams (e.g., beamformed communications), a UE may receive some information transmitted by a BS in a common search space (CSS) and some information transmitted by the BS in a user-specific search space (USS). As will be described in more detail with respect to FIG. 7, in certain scenarios, the UE may receive signals transmitted in the USS and not receive signals transmitted in the CSS. In such a coverage mismatch between the CSS and the USS, the UE may not receive certain information which may be transmitted via the CSS (and not via the USS). Aspects of the present disclosure provide methods for identifying a coverage mismatch and actions to take by the UE and/or BS in the event of an identified coverage mismatch.

According to another example, a UE may experience a coverage mismatch between a NR-SS/PBCH transmission and the USS. Similar to the example described above with respect to the coverage mismatch between the CSS and the USS, the UE may receive certain information transmitted via the USS and may not receive the NR-SS/PBCH. Aspects of the present disclosure provide methods for identifying this coverage mismatch and actions to take by the UE and/or BS in the event of a coverage mismatch between the NR-SS/PBCH and the USS.

UEs 120 may be configured to perform the operations 900 and other methods described herein and discussed in more detail below regarding USS and CSS coverage mismatch. BS 110 may comprise a transmission reception point (TRP), Node B (NB), gNB, access point (AP), new radio (NR) BS, gNodeB, 5GNB, etc.). The NR network 100 may include the central unit. The BS 110 may perform complementary operations to the operations 900 performed by the UE. The BS 110 may perform the operations 800 and other methods described herein regarding a UE's USS and CSS coverage mismatch.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
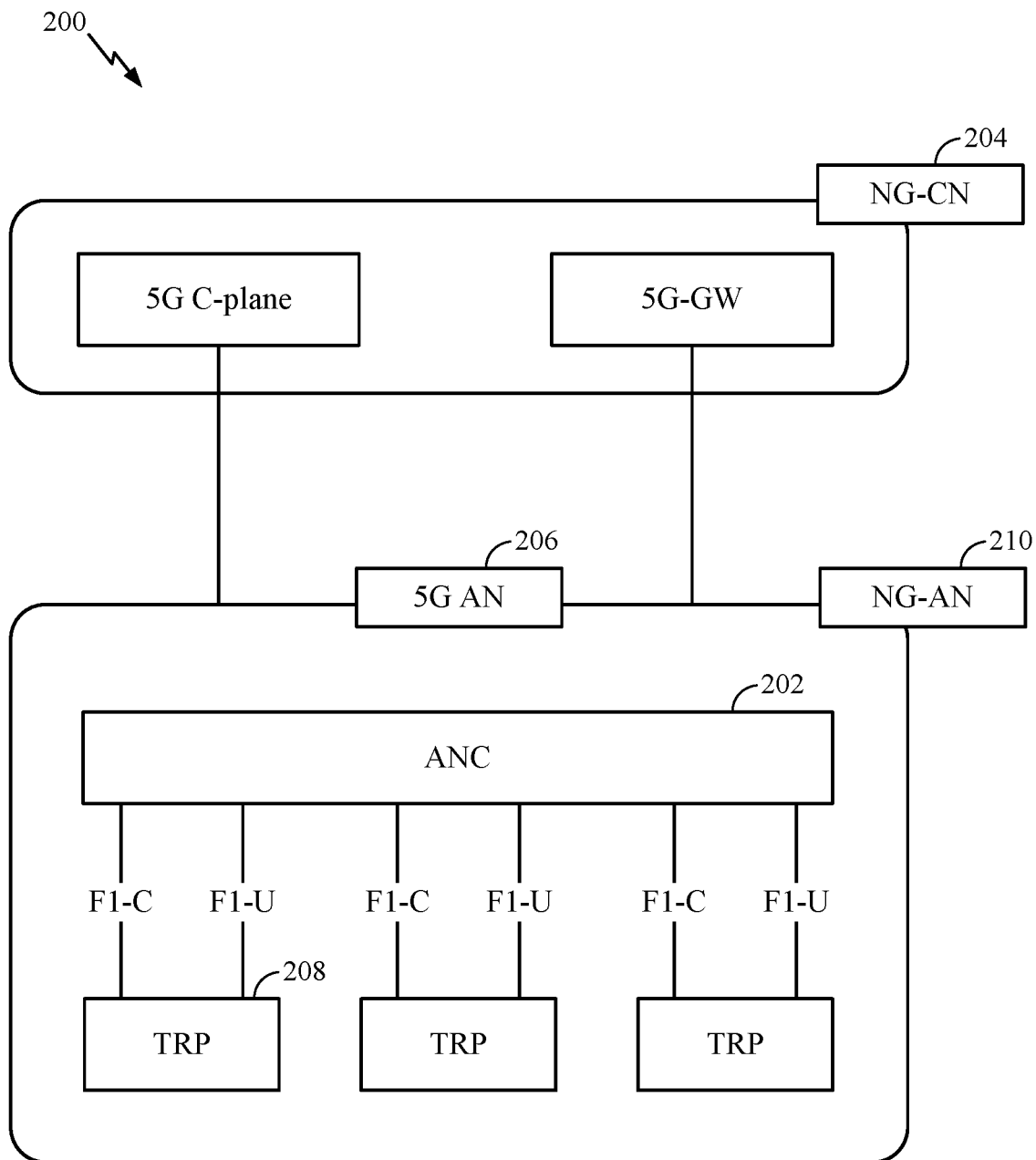
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
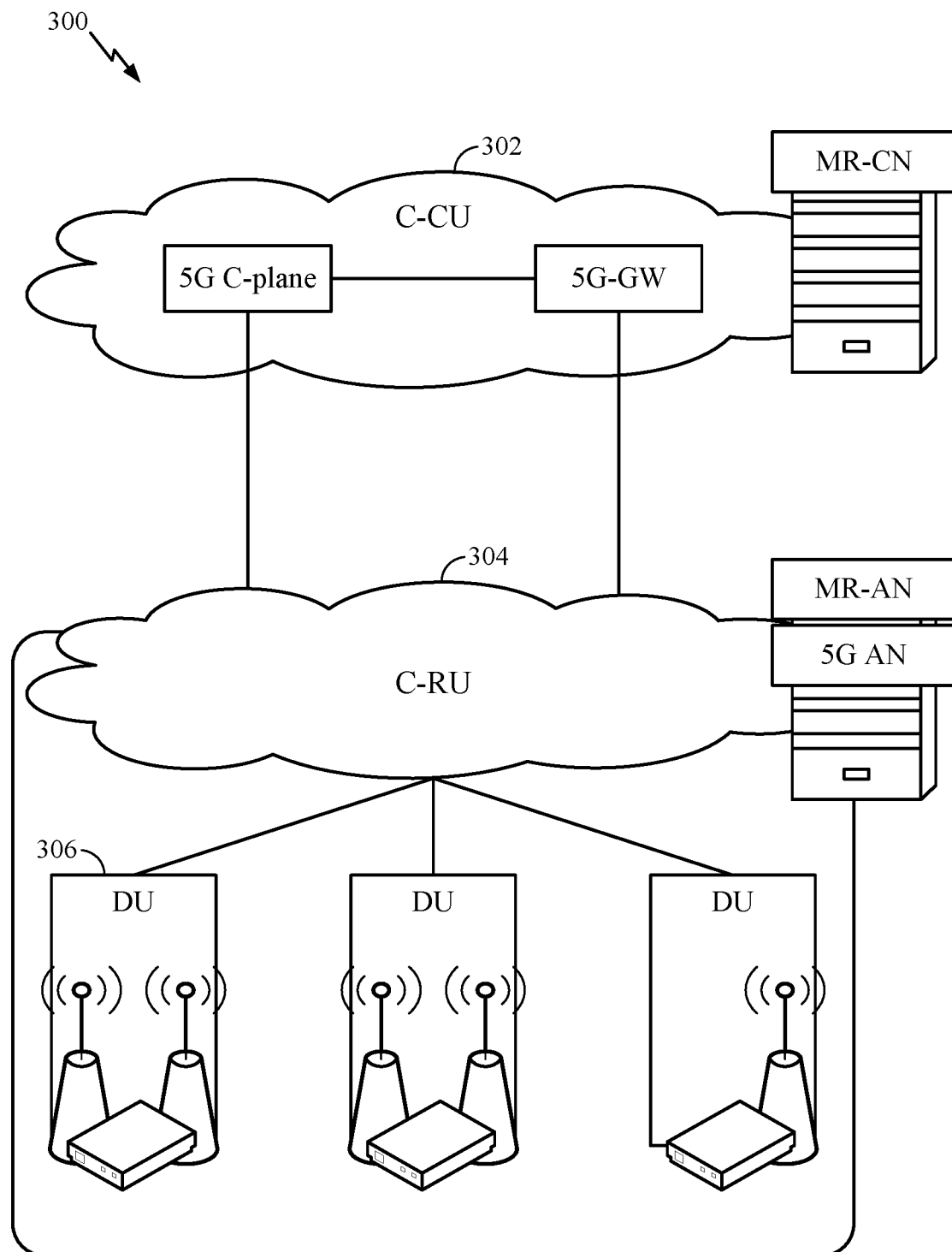
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
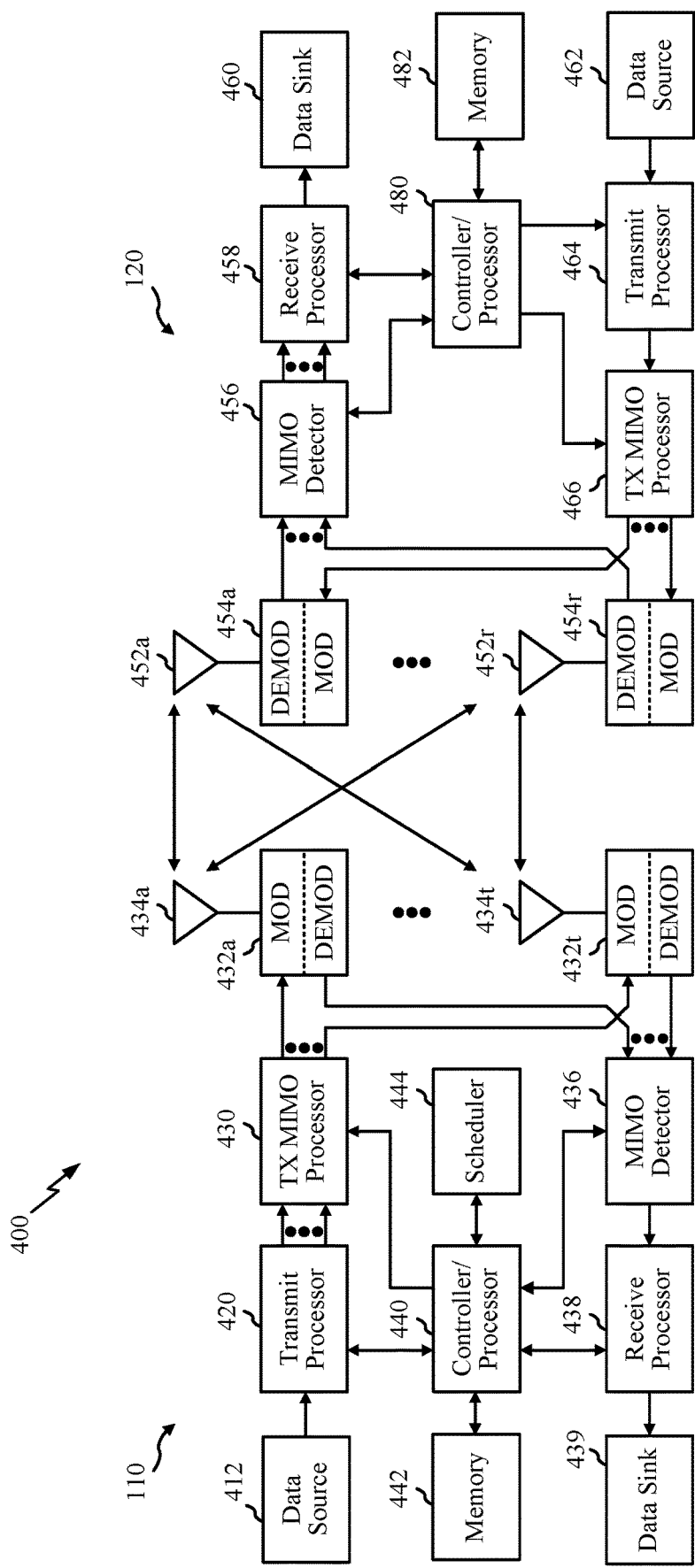
FIG. 4 is a block diagram conceptually illustrating a design of an example base station (BS) and user equipment (UE), in accordance with certain aspects of the present disclosure.
Figure 8:
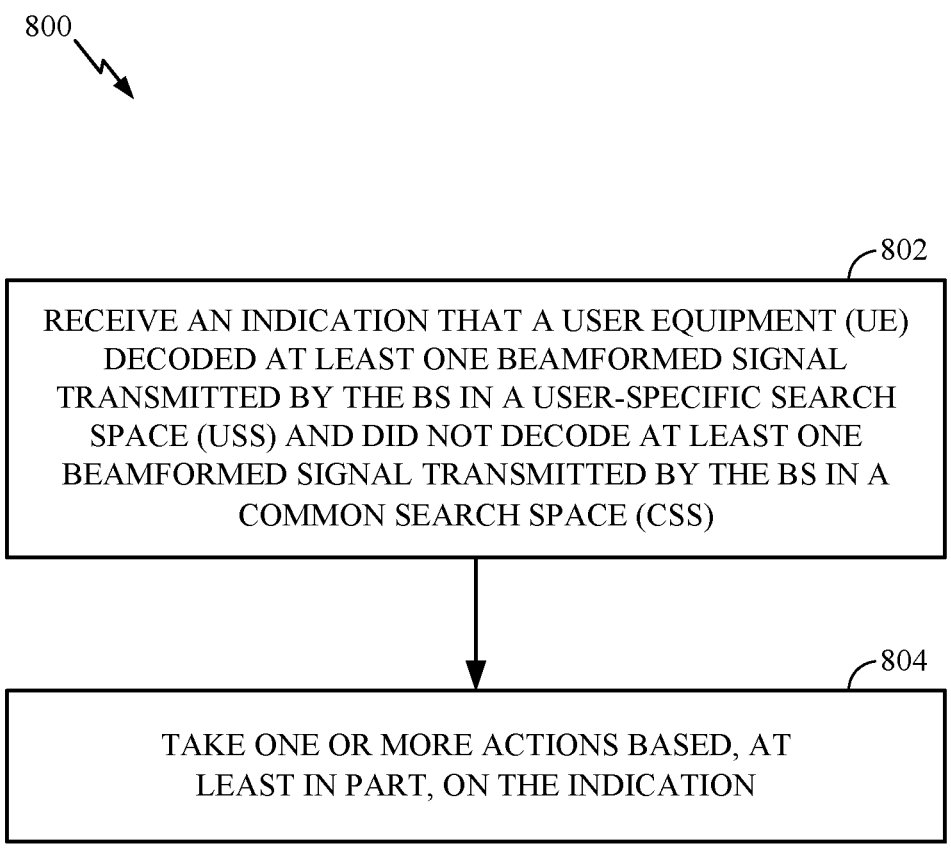
FIG. 8 illustrates example operations performed by a BS, in accordance with certain aspects of the present disclosure.
Figure 9:
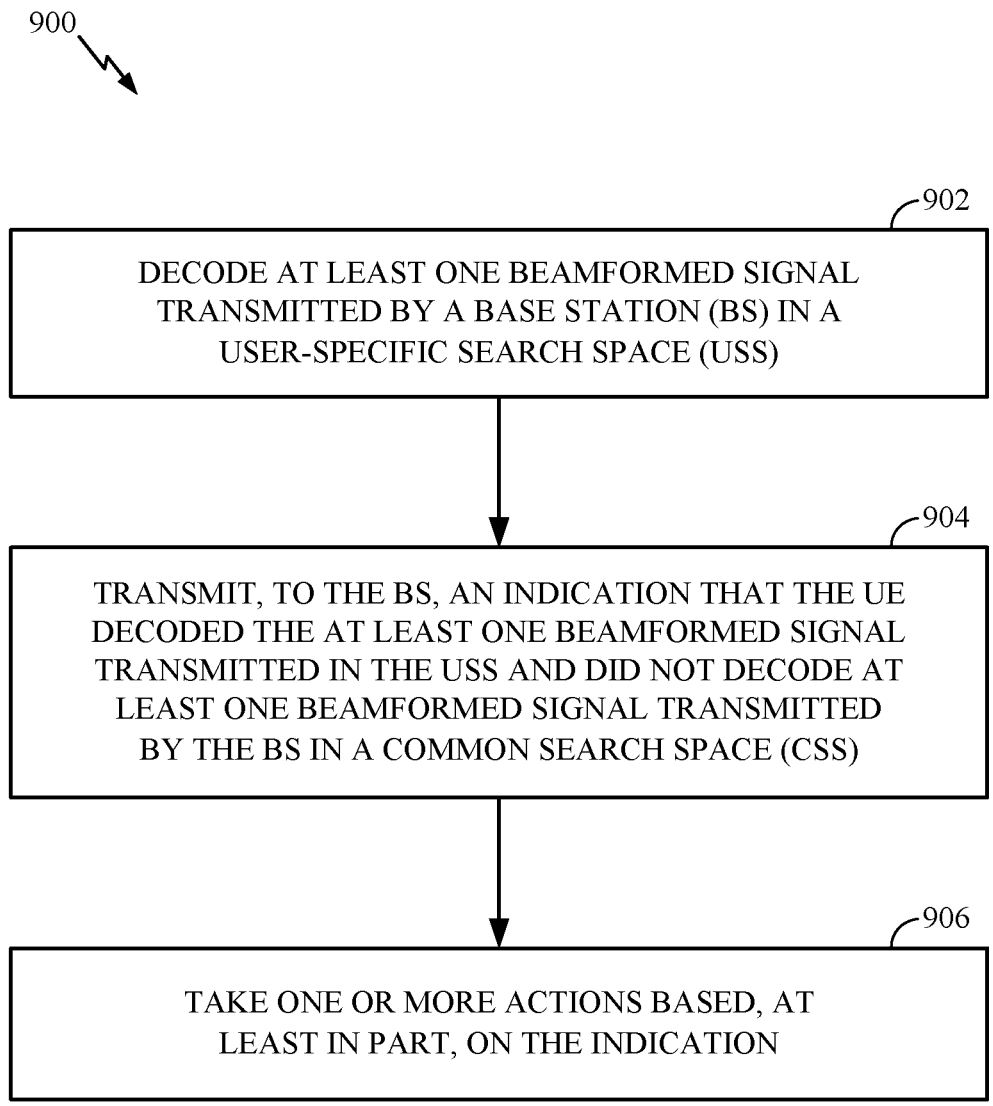
FIG. 9 illustrates example operations performed by a UE, in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and as illustrated in FIGS. 8-9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
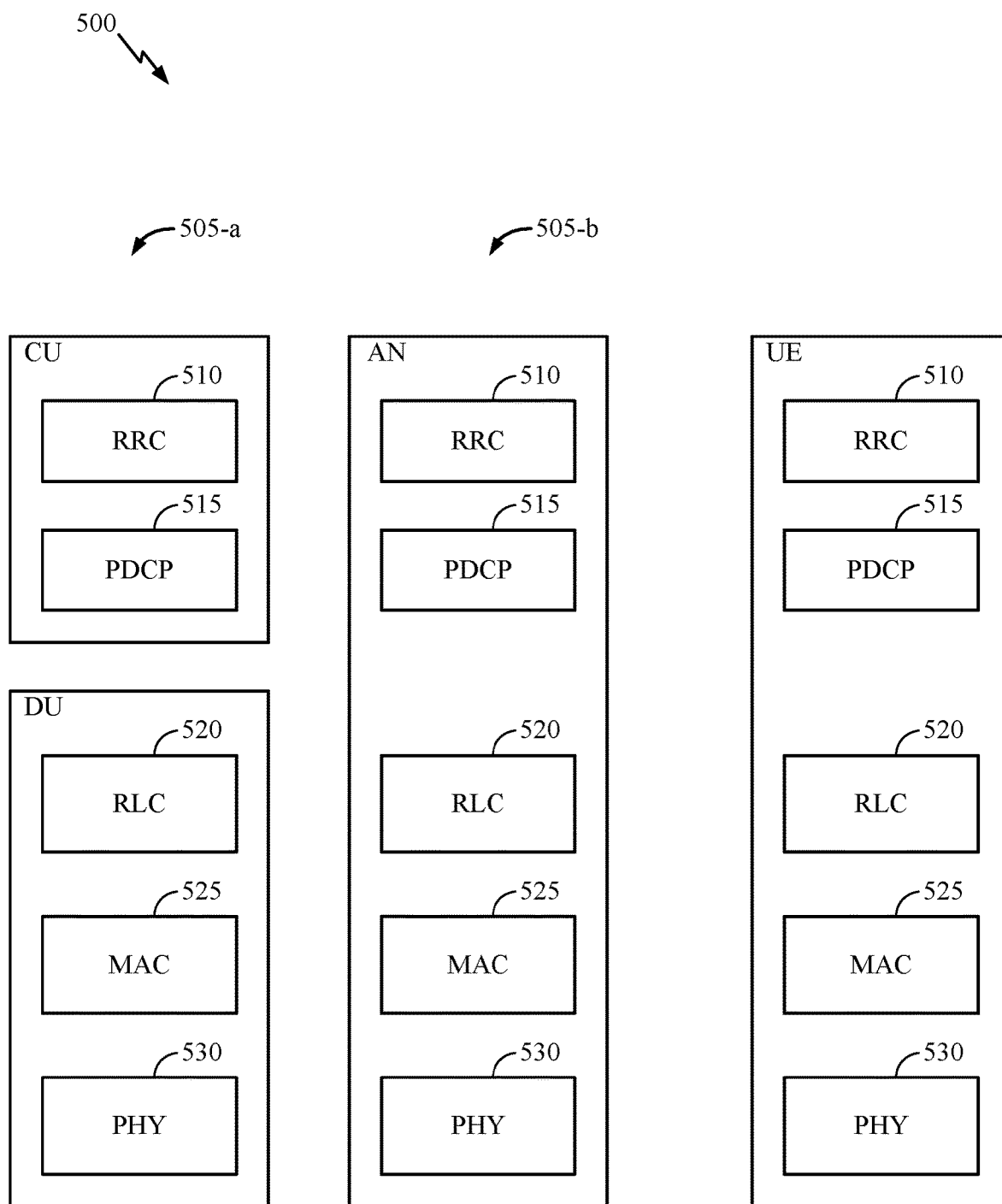
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
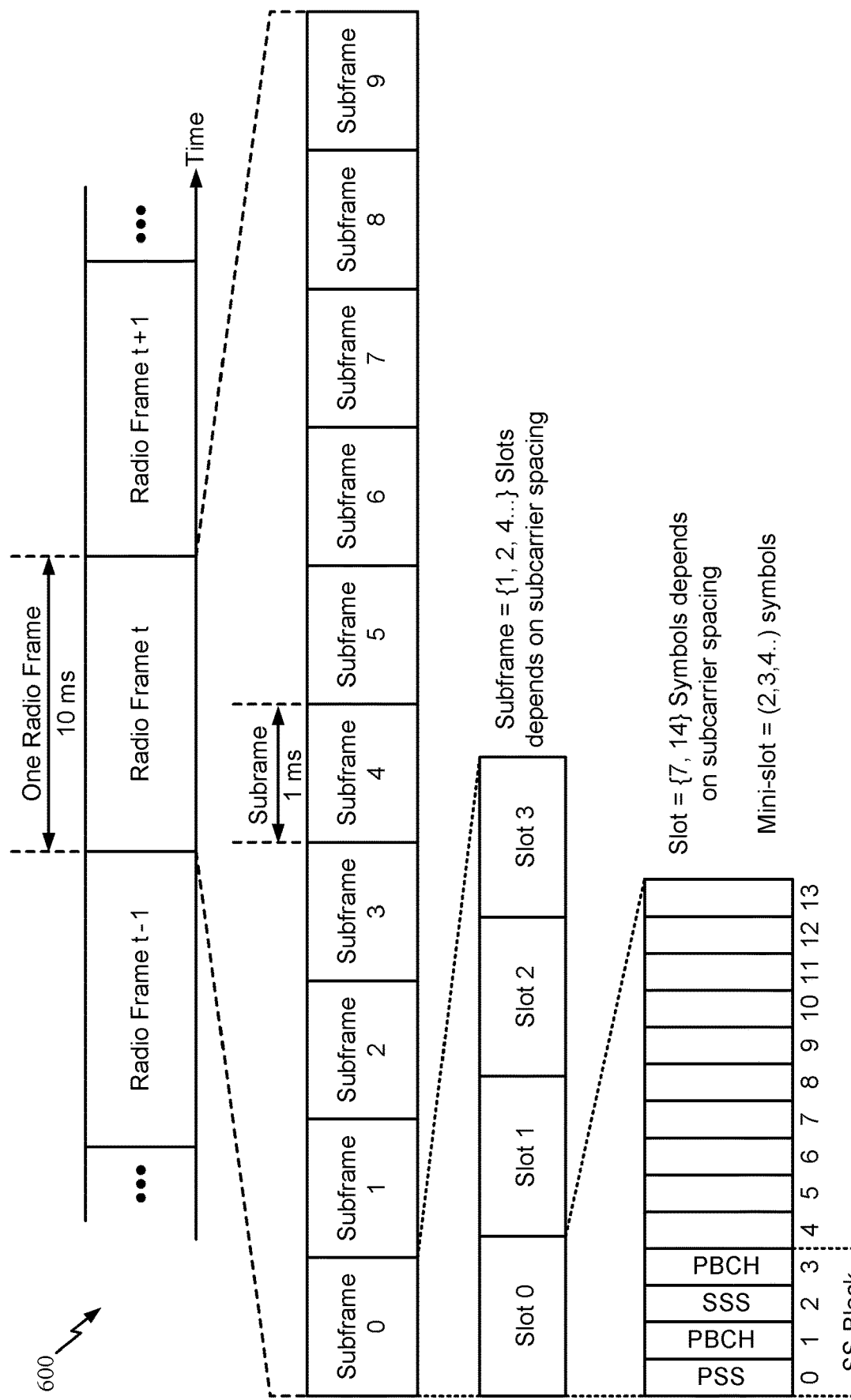
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE UE INDICATION OF COVERAGE MISMATCH BETWEEN CSS AND USS

Certain wireless communication standards use beamformed transmissions, wherein active beams are used to transmit and receive control and data. Some data and control beams are transmitted in a common search space (CSS) while other data and control beams are transmitted in a user-specific search space (USS). Beams transmitted in the CSS may carry Required Minimum System Information (RMSI). RMSI may include PDCCH and the corresponding PDSCH. The PBCH may be transmitted using beams outside of the USS (e.g., using non-USS beams).

In one example of beamformed communication using a CSS and USS, idle mode users may receive information transmitted in the CSS. After establishing a connection to the network using the CSS, the user may be served via a dedicated beam for PDCCH and PDSCH in the USS. The beams used for USS may be obtained based on channel state information-reference signals (CSI-RSs).

Figure 7:
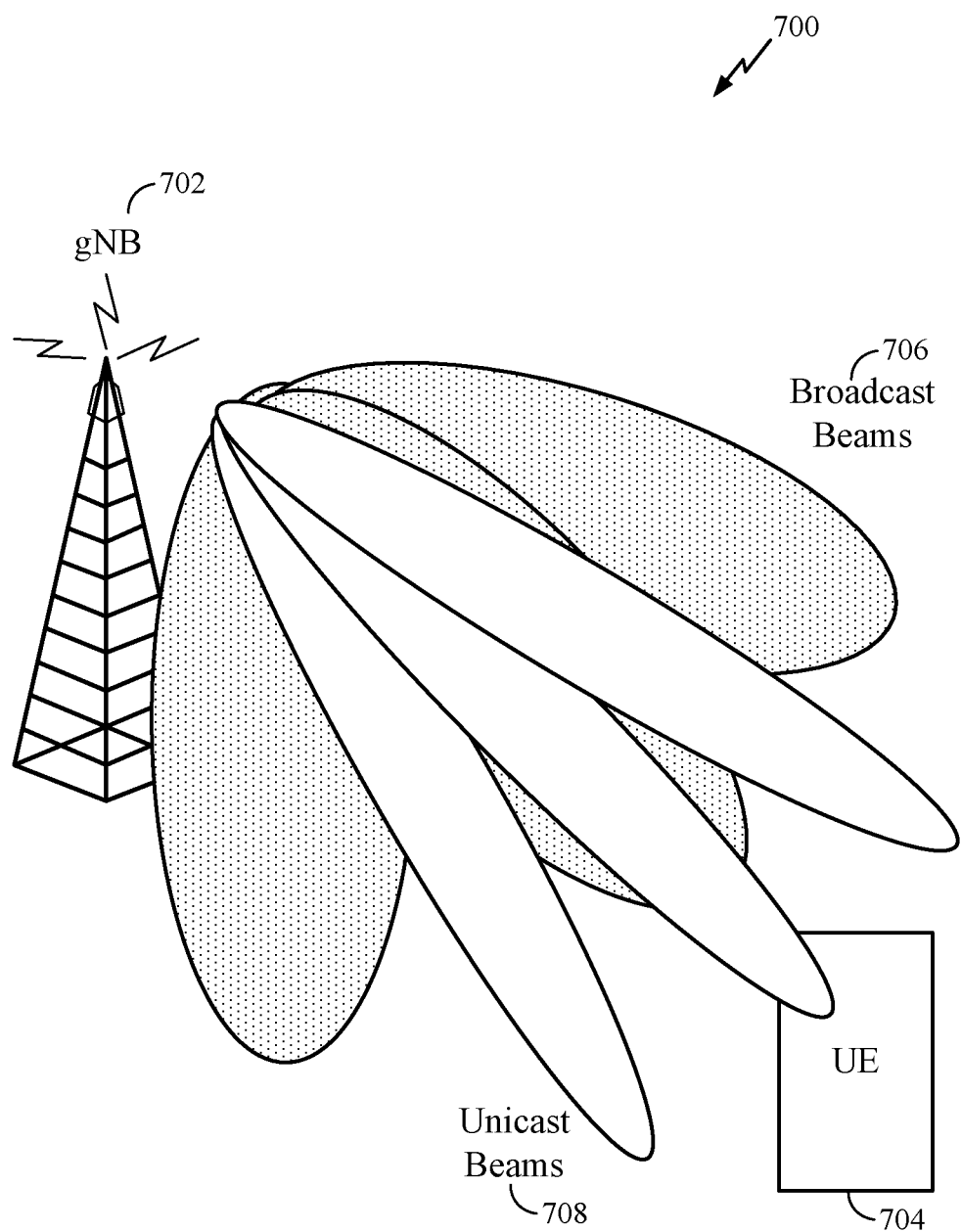
FIG. 7 illustrates an example of CSS and USS, in accordance with certain aspects of the present disclosure.

FIG. 7 illustrates an example 700 of beamformed communication including a CSS and USS. A BS (e.g., gNB) 702 communicates with a UE 704 using active beams. The BS transmits some signals using beams transmitted in a CSS 706. The BS transmits some signals using beams transmitted in a USS 708. In one example, beams in the CSS may include broadcast transmissions. The beams in the USS may include unicast transmissions. Unicast beams may have better coverage as compared to broadcast beams, for example, due to beam management and refinement procedures for unicast beams. As illustrated in FIG. 7, the CSS beams 706 may be wider than the USS beams 708. Additionally, the CSS beams 706 may not reach as far as the narrower, USS beams 708.

According to one example, information transmitted in the CSS (e.g., beams 706) includes PDCCH and PDSCH to carry RMSI. RMSI may include information similar to System Information Block-1 (SIB1) and SIB-2 in LTE. RMSI is carried via PDSCH and PDCCH (provides grants for PDSCH). In mmWave systems, the RMSI may be beam swept, similar to a Master Information Block (MIB). According to an example, RMSI may not be transmitted in the USS (e.g., via beams 708).

As noted above, a UE entering the system may receive information via beams transmitted in the CSS. Accordingly, the UE may receive RMSI via beams 706. After obtaining system information, the UE may be served using dedicated beams in the USS 708. In certain scenarios, it may be possible that a UE is within the area of a USS and not in the area of the CSS. In one example, UE 704 may be within the area of the USS 708 and may not be in the coverage area of the CSS 706. As described below, the UE 704 is in a coverage mismatch scenario.

By way of analogy, coverage of the CSS and the USS may be thought of as two concentric circles. The diameter of the circle representing the coverage area of the CSS may be smaller than the diameter of the circle representing the coverage area of the USS. Accordingly, a UE may be in the coverage area of the outer circle, representing the USS and not in the coverage area of the inner circle, representing the CSS. This scenario may be referred to as a CSS and USS coverage mismatch.

According to another example, a coverage mismatch may occur when a UE is in the coverage area of the USS and may not be in the coverage area of a NR-SS or PBCH. Similar to RMSI, NR-SS and PBCH may not be transmitted in the USS. NR-SS may include NR-primary synchronization signal (NR-PSS), NR-secondary synchronization signal (NR-SSS), and demodulation reference signal (DM-RS). Applying the analogy of two concentric circles used above, may UE may be in the coverage area of the outer circle which represents the USS and may not be in the coverage area of the smaller, inner circle which represents the NR-SS/PBCH.

With reference to FIG. 7, a UE may be in a coverage mismatch when it is in the coverage area of a USS 708 and not in the coverage area of the CSS 706. As illustrated, UE 704 may experience a mismatch. Because some information may be transmitted using the CSS and not using the USS, UE 704 may not be able to receive information transmitted via the CSS. The BS 702 may be unaware of the UE's 704 coverage mismatch. Stated otherwise, the BS 702 may not know the UE 704 is only reachable using the beams in the USS 708 and may not be receiving the beams in the CSS 706.

Because PBCH and RMSI are transmitted via broadcast beams which may be outside of the USS (for example, RMSI is transmitted in the CSS), if the BS 702 changes the PBCH or CSS, the UE 704 may not be able to receive the PBCH and RMSI. A UE outside the coverage area of broadcast beams but within the coverage of unicast beam may observe good decoding performance on the PDCCH-USS and corresponding PDSCH while failing to decode the PDCCH-CSS (e.g., failing to decode the RMSI) and/or failing to detect the NR-SS or decode PBCH. Advantageously, aspects of the present disclosure provide methods for identifying a mismatch and actions to take in the event of an identified mismatch.

FIG. 8 illustrates example operations 900 which may be performed by BS, according to aspects of the present disclosure. The BS may include one or more modules of BS 110 illustrated in FIG. 4.

At 802, the BS may receive an indication that a UE decoded at least one beamformed signal transmitted by the BS in a user-specific search space (USS) and did not decode at least one beamformed signal transmitted by the BS in a common search space (CSS). At 804, the BS may take one or more actions based, at least in part, on the indication.

FIG. 9 illustrates example operations 900 which may be performed by UE, according to aspects of the present disclosure. The UE may include one or more modules of UE 120 illustrated in FIG. 4.

At 902, the UE may decode at least one beamformed signal transmitted by a base station (BS) in a user-specific search space (USS). At 904, the UE may transmit, to the BS, an indication that the UE decoded the at least one beamformed signal transmitted in the USS and did not decode at least one beamformed signal transmitted by the BS in a common search space (CSS). At 906, the UE may take one or more actions based, at least in part, on the indication.

The BS (e.g., network or network entity) may configure signal quality thresholds to determine the performance of PDCCH. One set of configurations may be for the PDCCH in the USS (CSI-RS for the UE to monitor in the USS) and another set of configurations may be for the in PDCCH in the CSS. Accordingly, the BS may configure a first threshold value for PDCCH-CSS and a second threshold value for PDCCH-USS. The UE may monitor both of these beams using the respective threshold values. The monitoring may be similar to a radio link procedure in LTE, wherein the UE transmits a "synch" or "out of synch" indication to the network. Based on the measurements and threshold values, the UE may determine when it may be experiencing a coverage mismatch.

According to an example, the UE may perform measurements of reference signals that are QCL with a signal transmitted in the CSS. If the UE is only in the coverage area of the USS, it may determine one or more out of synch indications with the CSS. A lower layer at the UE (L1) may transmit a number of out of synch (OOS) indications (consecutive OOS indications) when it is not in the coverage area of the CSS. This may indicate the UE cannot decode the PBCH and/or RMSI. In this manner, the UE may use PBCH decoding or RMSI decoding success/failure as a performance measure.

Similarly, the UE may perform measurements of reference signals that are QCL with a signal transmitted in the USS. A lower layer at the UE (L1) may transmit a number of out of synch (OOS) indications (consecutive OOS indications) when it is not in the coverage area of the USS. This may indicate the UE cannot decode the PDCCH-USS and corresponding PDSCH.

If the UE cannot decode PDCCH-CSS (e.g., RMSI) and UE can decode PDCCH-USS (e.g., control/data dedicated to the user), the UE may be in a coverage mismatch scenario. Similarly, if the UE cannot decode detect the NR-SS or decode PBCH and the UE can decode the PDCCH USS, the UE may be in a coverage mismatch scenario.

According to an example, the UE may measure the reference signal receive power (RSRP) of an RS QCL with the CSS and an RS QCL with the USS. The UE may compare the RSRPs in an effort to determine a coverage mismatch. For example, a stronger RSRP associated with the RS QCL with the USS as compared to the RSRP associated with the RS QCL with the CSS may indicate a coverage mismatch. According to another example, the UE may report the RSRPs of RS QCL with the CSS and the USS to the BS and the BS may determine the UE is in a coverage mismatch environment.

When the UE determines it may be experiencing a coverage mismatch, it may transmit an indication to the BS that it cannot decode CSS but can decode USS. The indication may be transmitted using any uplink configured resource. For example, the indication may be transmitted by the UE via a scheduling request (SR), a beam failure recovery request, or in a RACH region. The indication may be transmitted via the PUCCH, PUSCH, or RRC signaling. Additionally or alternatively, the UE may indicate the coverage mismatch by a scrambling sequence used for an UL reference signal. The BS may configure a scrambling sequence used to indicate a coverage mismatch, which the UE may use when transmitting an UL SRS.

In response to the indication of the mismatch from the UE, the BS may handover the UE to a neighbor BS (that does not have a mismatch or has mismatch is less than the current, serving BS). For example, the neighbor BS may have a more balanced CSS or USS coverage.

According to aspects, in response to the indication of the mismatch, the BS may determine that there is no change in the PBCH or RMSI. For example, the BS may determine that while the UE is experiencing a coverage mismatch, the PBCH or RMSI has not changed since the UE the left an area defined by the CSS. Because the UE may have the current PBCH or RMSI, the current, serving BS may continue to serve the UE.

According to aspects, in response to the indication of the mismatch, the BS may choose to disconnect the call if the PBCH or RMSI has changed in such a way that may impact the connection. For example, the BS may disconnect the call if the cell may get barred. According to aspects, the UE may choose to disconnect the call in when it identifies it is in a coverage mismatch environment. In on example, the UE may choose to disconnect the call autonomously in a coverage mismatch scenario.

According to aspects, in response to the indication of the mismatch, the BS may balance the coverage area of CSS and USS in one or more beam directions. For example, the BS may balance beam coverage in certain directions based, at lea tin part, on feedback from the UE.

According to aspects, in response to the indication of the mismatch, the BS may transmit the PBCH, RMSI, and/or other SIBs via dedicated signaling to the UE on the USS.

According to aspects, in response to determining the UE is in a coverage mismatch scenario, the UE may initiate a forward handover procedure (UE-based mobility) and proactively begin handover to another BS.

The methods described herein with reference to a CSS and USS coverage mismatch are provided for illustrative purposes only. Similar methods may be applied to identify a coverage mismatch between the USS and a NR-SS or between a USS and the PBCH. Moreover, the UE and BS may take similar actions as described herein in response to the identified mismatch between the USS and the NR-SS/PBCH.

For dual-connectivity (DC) or carrier aggregation (CA), the secondary cell (Scell) transmits the PBCH and may transmit RMSI. The UE may use PBCH decoding as a metric for performance of the CSS for both the primary cell and the secondary cell and/or for the multiple component carriers. In EUTRA NR DC or CA scenarios, the UE may determine mismatch between NR-SS and CSI-RS QCL with PDCCH-USS based on signal measurements. The UE may use PBCH decoding success/failure as a performance measure in comparing CSS to the decoding performance of PDCCH-USS. The UE may provide an indication of a coverage mismatch for one or more of a PSS and/or SSS. The UE may provide an indication of a coverage mismatch for one or more of CCs as well.

As an example for DC, both a primary BS and the secondary BS may transmit beamformed signals in the CSS and the USS. As another example, both BS may transmit signals in the USS and a PBCH. The UE may decode or attempt to decode signals in the USS (or signals QCL with the USS) and decode a PBCH (or a signal QCL with the PBCH). Based on these measurements, a UE may determine a coverage mismatch for the primary cell, the secondary cell, or both.

As an example for CA, a first CC may be used to transmit a signal in the USS and in the CSS. A second CC may also be used to transmit a signal in the USS and the CSS. The UE may decode or attempt to decode signals transmitted in using both CCs in an effort to determine a coverage mismatch for each of the CCs.

Aspects of the present disclosure provide methods to identify (or determine) a CSS and USS coverage mismatch and steps to take upon identifying a potential coverage mismatch. Advantageously, pursuant to the techniques described herein, a BS may determine when a UE is in a coverage mismatch, may not be receiving information transmitted in the CSS, and may take action accordingly.

Figure 10:
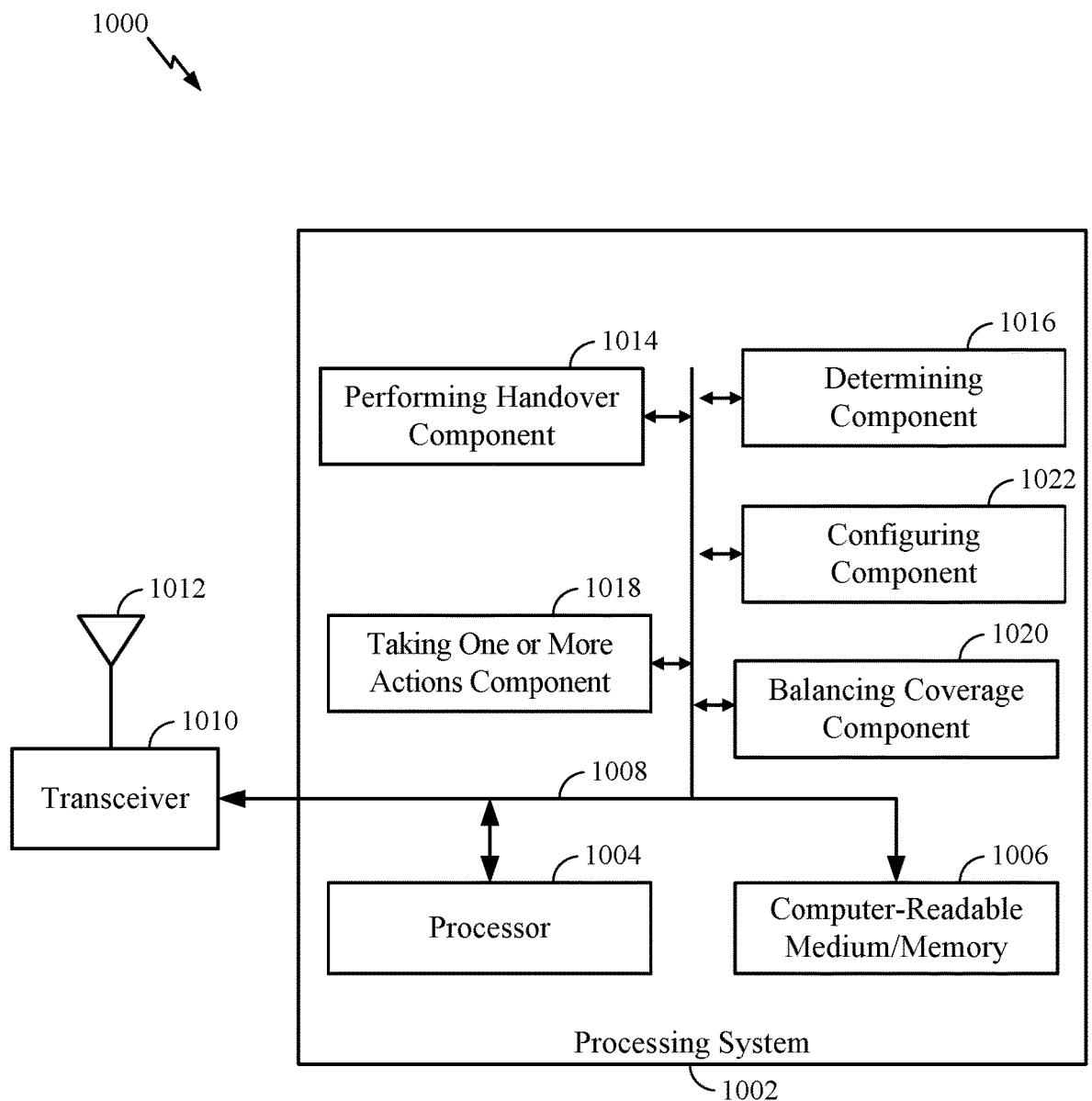
FIG. 10 illustrates a communications device, such as a BS, that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1010. The transceiver 1010 is configured to transmit and receive signals for the communications device 1000 via an antenna 1012, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1006 via a bus 1008. In certain aspects, the computer-readable medium/memory 1006 is configured to store instructions that when executed by processor 1004, cause the processor 1004 to perform the operations illustrated in FIG. 8 and described herein.

In certain aspects, the processing system 1002 further includes a performing handover component 1014, a determining component 1016, a taking one or more actions component 1018, a balancing coverage component 1020, and a configuring component 1022. In certain aspects, the components 1014-1020 may be hardware circuits. In certain aspects, the components 1014-1022 may be software components that are executed and run on processor 1004.

Figure 11:
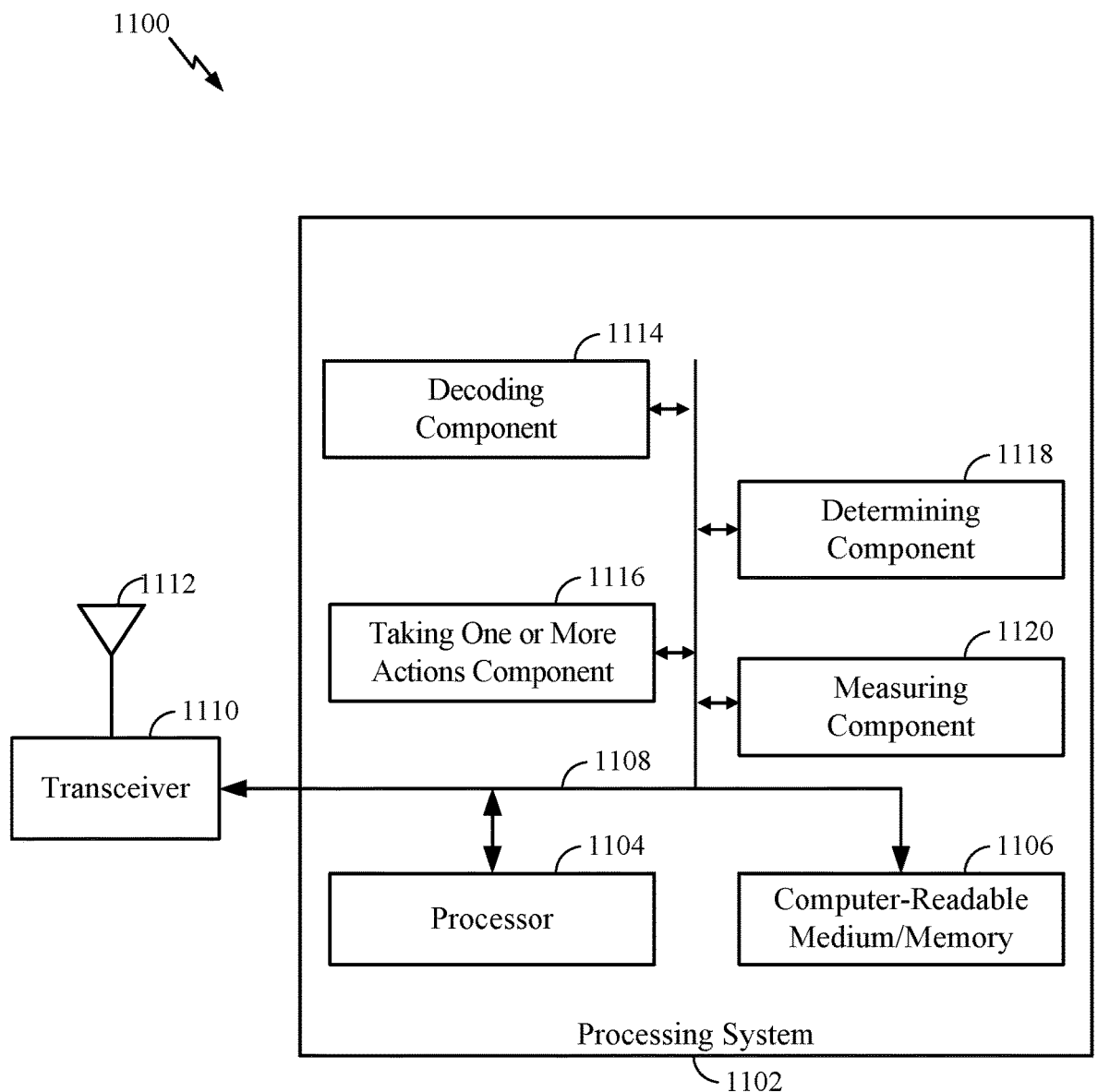
FIG. 11 illustrates a communications device, such as a UE, that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1110. The transceiver 1110 is configured to transmit and receive signals for the communications device 1100 via an antenna 1112, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1106 via a bus 1108. In certain aspects, the computer-readable medium/memory 1106 is configured to store instructions that when executed by processor 1104, cause the processor 1104 to perform the operations illustrated in FIG. 9 and described herein.

In certain aspects, the processing system 1102 further includes a decoding component 1114, a taking one or more actions component 1116, a determining component 1118, and a measuring component 1120. In certain aspects, the components 1114-1120 may be hardware circuits. In certain aspects, the components 1114-1120 may be software components that are executed and run on processor 1104.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

According to aspects, the means for receiving, means for transmitting, means for detecting, and means for taking one or more actions may be performed by one or more of antennas 452, Tx/Rx 454, processors 466, 458, 464, and/or controller/processor 480 of the UE 120 or the antenna 434, Tx/Rx 432, processors 420, 430, 438, and/or controller/ processor 440 of the BS 110.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   transmitting system information to a user equipment (UE) in a first common search space (CSS) transmission;
   receiving an indication of a coverage mismatch indicating that the UE decoded at least one beamformed signal transmitted by the BS in a user-specific search space (USS) and did not decode at least one beamformed signal transmitted by the BS in a subsequent CSS transmission;
   responsive to receiving the indication, determining whether the system information has changed since the first CSS transmission; and
   taking one or more actions based, at least in part, on the determining whether the system information has changed since the first CSS transmission.

2. The method of claim 1, further comprising:
   configuring the UE with a first threshold value associated with CSS transmissions; and
   configuring the UE with a second threshold value associated with the beamformed signal transmitted in the USS.

3. The method of claim 1, further comprising:
   configuring the UE with at least one scrambling sequence for uplink transmission, wherein the scrambling sequence indicates the UE decoded at least one beamformed signal transmitted by the BS in the USS and did not decode at least one beamformed signal transmitted by the BS in the subsequent CSS transmission,
   wherein the received indication is scrambled using the at least one scrambling sequence.

4. The method of claim 1, wherein the indication is received via at least one of: a scheduling request (SR), a beam failure recovery request, or a random access channel (RACH) resource.

5. The method of claim 1, wherein the indication is received via at least one of a physical uplink control channel, a physical uplink shared channel, or radio resource control (RRC) signaling.

6. The method of claim 1, wherein taking the one or more actions comprises:
   performing a handover of the UE from the BS to a neighboring BS responsive to a determination that the system information has changed since the first CSS transmission.

7. The method of claim 1, wherein the determining whether the system information has changed since the first CSS transmission comprises:
   determining the UE does not have a current Physical Broadcast Channel (PBCH) or a current Remaining Minimum System Information (RMSI) transmitted via the CSS,
   wherein taking the one or more actions comprises, discontinuing serving the UE.

8. The method of claim 1, wherein taking the one or more actions comprises:
   balancing coverage of CSS transmissions and the USS based, at least in part, on feedback from the UE.

9. The method of claim 1, wherein taking the one or more actions comprises:
   transmitting, to the UE, at least one of a Physical Broadcast Channel (PBCH), Remaining Minimum System Information (RMSI), or System Information Blocks (SIBs) via dedicated signaling.

10. The method of claim 1, wherein the BS comprises a primary BS and further comprising:
    receiving a second indication the UE decoded at least one beamformed signal transmitted in a USS associated with a secondary BS and did not decode at least one beamformed signal transmitted in a CSS by the secondary BS,
    wherein the one or more actions are further based, at least in part, on the second indication.

11. The method of claim 1,
wherein the indication is associated with a first component carrier, and further comprising:
receiving a second indication the UE decoded at least one beamformed signal transmitted in a USS associated with a secondary component carrier (CC) and did not detect at least one beamformed New Radio synchronization signal (NR-SS) or decode a beamformed Physical Broadcast Channel (PBCH) associated with the secondary CC,
wherein the one or more actions are further based, at least in part, on the second indication.

12. A method for wireless communication by a user equipment (UE), comprising:
receiving system information from a base station (BS) in a first common search space (CSS) transmission;
decoding at least one beamformed signal transmitted by the BS in a user-specific search space (USS);
transmitting, to the BS, an indication of a coverage mismatch indicating that the UE decoded the at least one beamformed signal transmitted in the USS and did not decode at least one beamformed signal transmitted by the BS in a subsequent CSS transmission; and
taking one or more actions based, at least in part, on a determination of whether the system information has changed since the first CSS transmission.

13. The method of claim 12, further comprising:
determining the UE decoded the beamformed signal in the USS based on measurement of a reference signal (RS) that is quasi co-located (QCL) with the beamformed signal transmitted in the USS; and
attempting to measure a RS that is QCL with the beamformed signal transmitted in the subsequent CSS transmission.

14. The method of claim 12, further comprising:
receiving a first threshold value associated with CSS transmissions;
receiving a second threshold value associated with the beamformed signal transmitted in the USS; and
determining the UE did not decode the beamformed signal transmitted in the subsequent CSS transmission based on the first threshold value and determining the UE decoded the beamformed signal transmitted in the USS based on the second threshold value.

15. The method of claim 12, further comprising:
receiving at least one scrambling sequence for uplink transmission, wherein the scrambling sequence indicates the UE is able to decode at least one beamformed signal in the USS and is not able to decode at least one beamformed signal transmitted in the subsequent CSS transmission,
wherein the indication comprises an uplink transmission scrambled by the scrambling sequence.

16. The method of claim 12, wherein the indication is transmitted via at least one of: a scheduling request (SR), a beam failure recovery request, or a random access channel resource.

17. The method of claim 12, wherein the indication is transmitted via at least one of a physical uplink control channel, a physical uplink shared channel, or radio resource control (RRC) signaling.

18. The method of claim 12, wherein taking the one or more actions comprises:
discontinuing a call with the BS responsive to a determination that the system information has changed since the first CSS transmission.

19. The method of claim 12, wherein taking the one or more actions comprises:
receiving, from the BS, at least one of a Physical Broadcast Channel (PBCH), Remaining Minimum System Information (RMSI), or System Information Blocks (SIBs) via dedicated signaling in the USS.

20. The method of claim 12, wherein the BS comprises a primary BS and further comprising:
transmitting a second indication the UE decoded at least one beamformed signal transmitted in a USS associated with a secondary BS and did not decode at least one beamformed signal transmitted in a CSS associated with the secondary BS,
wherein the one or more actions are further based, at least in part, on the second indication.

21. The method of claim 12,
wherein the indication is associated with a first component carrier, and further comprising:
transmitting a second indication the UE decoded at least one beamformed signal transmitted in a USS associated with a secondary component carrier (CC) and did not detect at least one beamformed New Radio synchronization signal (NR-SS) or decode a beamformed Physical Broadcast Channel (PBCH) associated with the secondary CC, wherein the one or more actions are further based, at least in part, on the second indication.

22. An apparatus for wireless communication by a base station (BS), comprising:
means for transmitting system information to a user equipment (UE) in a first common search space (CSS) transmission;
means for receiving an indication of a coverage mismatch indicating that the UE decoded at least one beamformed signal transmitted by the BS in a user-specific search space (USS) and did not decode at least one beamformed signal transmitted by the BS in a subsequent CSS transmission; and
means for, responsive to receiving the indication, determining whether the system information has changed since the first CSS transmission; and
means for taking one or more actions based, at least in part, on the determining whether the system information has changed since the first CSS transmission.

23. The apparatus of claim 22, further comprising:
means for configuring the UE with a first threshold value associated with CSS transmissions; and
means for configuring the UE with a second threshold value associated with the beamformed signal transmitted in the USS.

24. The apparatus of claim 22, further comprising:
means for configuring the UE with at least one scrambling sequence for uplink transmission, wherein the scrambling sequence indicates the UE decoded at least one beamformed signal transmitted by the BS in the USS and did not decode at least one beamformed signal transmitted by the BS in the subsequent CSS transmission,
wherein the received indication is scrambled using the at least one scrambling sequence.

25. The apparatus of claim 22, wherein the indication is received via at least one of: a scheduling request (SR), a beam failure recovery request, or a random access channel (RACH) resource.

26. An apparatus for wireless communication by a user equipment (UE), comprising:
- means for receiving system information from a base station (BS) in a first common search space (CSS) transmission;
- means for decoding at least one beamformed signal transmitted by the BS in a user-specific search space (USS);
- means for transmitting, to the BS, an indication of a coverage mismatch indicating that the UE decoded the at least one beamformed signal transmitted in the USS and did not decode at least one beamformed signal transmitted by the BS in a subsequent CSS transmission; and
- means for taking one or more actions based, at least in part, on a determination of whether the system information has changed since the first CSS transmission.

27. The apparatus of claim 26, further comprising:
- means for determining the UE decoded the beamformed signal in the USS based on measurement of a reference signal (RS) that is quasi co-located (QCL) with the beamformed signal transmitted in the USS; and
- means for attempting to measure a RS that is QCL with the beamformed signal transmitted in the subsequent CSS transmission.

28. The apparatus of claim 26, further comprising:
- means for receiving a first threshold value associated with CSS transmissions;
- means for receiving a second threshold value associated with the beamformed signal transmitted in the USS; and
- means for determining the UE did not decode the beamformed signal transmitted in the subsequent CSS transmission based on the first threshold value and means for determining the UE decoded the beamformed signal transmitted in the USS based on the second threshold value.

29. The apparatus of claim 26, wherein the means for taking the one or more actions comprises:
- means for receiving, from the BS, at least one of a Physical Broadcast Channel (PBCH), Remaining Minimum System Information (RMSI), or System Information Blocks (SIBs) via dedicated signaling in the USS.

30. The apparatus of claim 26, wherein the BS comprises a primary BS and further comprising:
- means for transmitting a second indication the UE decoded at least one beamformed signal transmitted in a USS associated with a secondary BS and did not decode at least one beamformed signal transmitted in a CSS associated with the secondary BS,
- wherein the one or more actions are further based, at least in part, on the second indication.

* * * * *